United States Patent [19]

Cornick

[11] 4,355,958
[45] Oct. 26, 1982

[54] ROTARY IMPELLER FOR FLUID DRIVEN MACHINE

[76] Inventor: Roy C. Cornick, 2324 Ferry, Box 1447, Anderson, Calif. 96007

[21] Appl. No.: 303,591

[22] Filed: Sep. 18, 1981

[51] Int. Cl.³ .............................................. F03D 3/02
[52] U.S. Cl. ................................ 416/197 A; 416/243
[58] Field of Search ........................... 416/197 A, 243

[56] References Cited

U.S. PATENT DOCUMENTS

| 764,571 | 7/1904 | Fisher | 416/11 X |
|---|---|---|---|
| 979,098 | 12/1910 | Scheubeck | 416/197 A X |
| 1,200,308 | 10/1916 | Bunnell | 416/197 A X |
| 2,094,603 | 10/1937 | Keene | 416/197 A X |
| 2,252,788 | 8/1941 | Sparr | 416/197 A X |
| 3,930,750 | 1/1976 | Schultz | 416/197 A X |

FOREIGN PATENT DOCUMENTS

| 197772 | 4/1908 | Fed. Rep. of Germany | 416/197 A |
|---|---|---|---|
| 6791 | 3/1907 | France | 416/197 A |
| 2455192 | 12/1980 | France | 416/197 A |
| 564687 | 7/1975 | Switzerland | 416/197 A |
| 265754 | 2/1927 | United Kingdom | 416/197 A |

*Primary Examiner*—Everette A. Powell, Jr.
*Attorney, Agent, or Firm*—D. Paul Weaver

[57] ABSTRACT

A low drag and low profile fluid driven impeller can achieve a large diameter by utilizing notched cylindrical tube sections as impeller blades in stacked relationship on a common shaft. Simplicity and economy are inherent in the structure.

2 Claims, 7 Drawing Figures

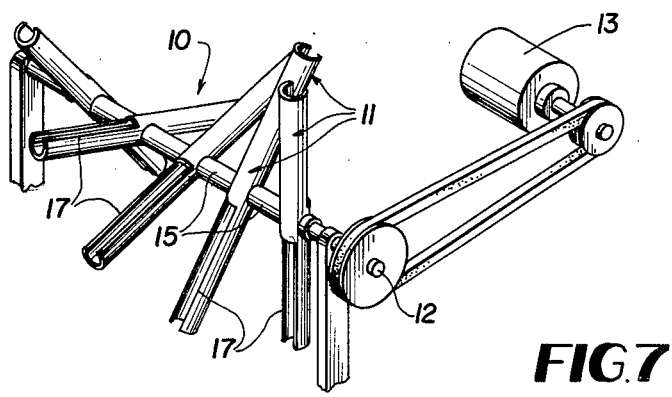
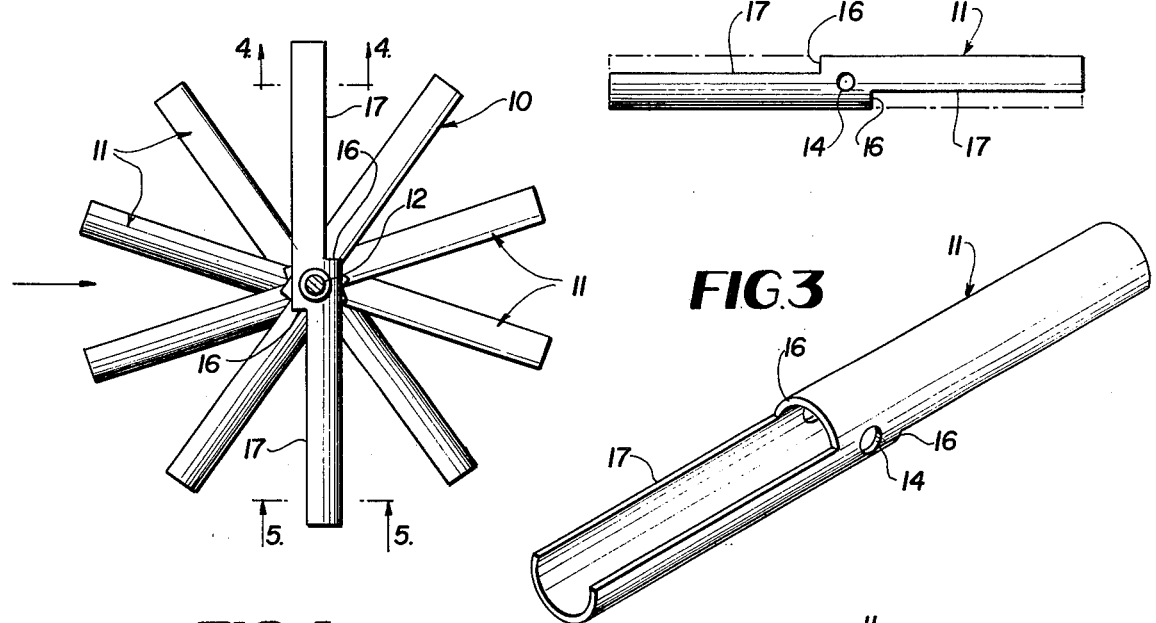
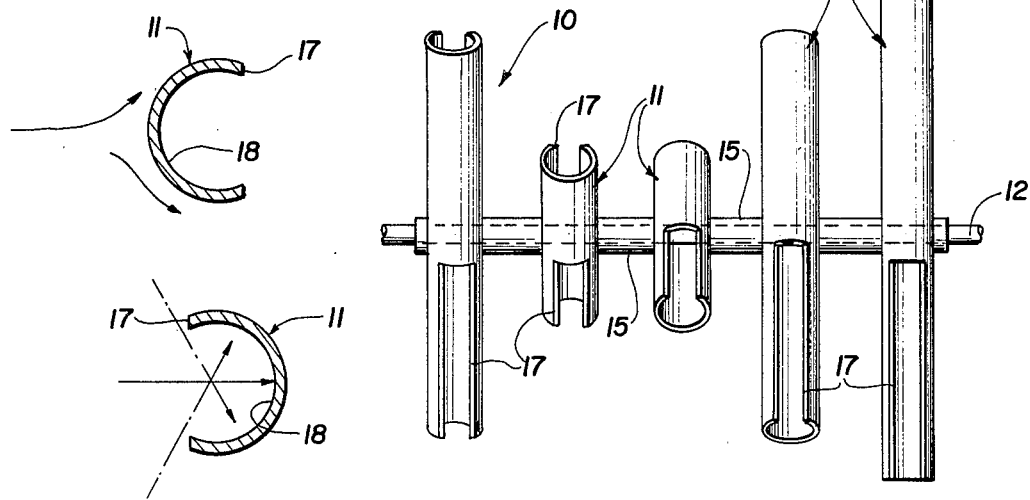

ROTARY IMPELLER FOR FLUID DRIVEN MACHINE

BACKGROUND OF THE INVENTION

The invention seeks to fulfill a need for a more efficient, lost cost, large diameter, low profile and low drag fluid impeller for various types of fluid driven machines, such as windmills and the like. Many prior art impellers have achieved one or more of the above features of the invention by sacrificing, in whole or in part, one or more of the other features. For example, in achieving a low drag and low profile impeller, the effective diameter of the impeller may be reduced unduly. If the diameter of the impeller is increased, the net drag may be unduly increased. Through the invention, these drawbacks of the prior art are overcome in an extremely simplified low cost structure suitable for a variety of applications on vertical axis and horizontal axis machines.

BRIEF DESCRIPTION OF THE DRAWINGS

FIG. 1 is a perspective view of a rotary impeller according to the invention depicting a use thereof.

FIG. 2 is an enlarged end elevational view of the impeller.

FIG. 3 is an enlarged perspective view of an impeller blade.

FIG. 4 is an enlarged transverse vertical section taken on line 4—4 of FIG. 2.

FIG. 5 is a similar section taken on line 5—5 of FIG. 2.

FIG. 6 is a side elevation of the impeller.

FIG. 7 is a side elevation on a reduced scale of one impeller blade.

DETAILED DESCRIPTION

Referring to the drawings in detail wherein like numerals designate like parts, a rotary impeller 10, in accordance with the invention, comprises a plurality of equal length impeller blades 11 fixed in equidistantly spaced relationship axially on a common driven or working shaft 12 which may serve to power any rotary machine, such as a generator 13, FIG. 1. The impeller 10 forming the subject matter of the invention may have a vertical axis, a horizontal axis or any intermediate angular axis depending upon application and the invention is not limited to any particular disposition of the impeller or rotor axis, the drawings being intended merely to show the construction of the impeller.

The several rotor blades 11, as shown in FIG. 2, are preferably spaced equidistantly circumferentially around the axis of shaft 12. The details of attachment of the blades 11 to the driven shaft 12 may be varied. In the illustrated arrangement, each blade 11 at its longitudinal center has a transverse through opening 14 receiving the shaft 11 with spacer sleeves 15 being intervened with the several rotor blades, as shown best in FIG. 6. In some cases, the openings 14 can be omitted and the blades 11 can be secured to the shaft 12 by clamping straps similar to pipe or hose clamps.

The essence of the invention lies in the formation of the impeller blades 11 of equal length sections of cylindrical pipe or tubing, such as plastic tubing having a suitable diameter and wall thickness for a given application of the impeller. Each cylindrical pipe section, after being cut to proper length, is notched in diametrically opposite sides and from the ends of the pipe section to radial shoulders 16 which are spaced equidistantly from the central through opening 14, the elongated notches thus produced being indicated at 17 in the drawings. The removed material, due to the notching of the pipe section, is shown by phantom lines in FIG. 7.

The oppositely facing notches 17 provided in each impeller blade 11 form interior blade cavities 18 on each blade 11 spanning approximately 230 degrees circumferentially of the blade, although this included angle can be varied somewhat by varying the depths of the notches 17. The two notches 17 are of equal depths on each blade 11 and symmetrical with the longitudinal axis of the blade and its longitudinal center. As shown in the drawings, each basically cylindrical blade 11, after being notched at 17, presents a pair of equal length slightly more than semicylindrical air scoops across the flow path of the fluid medium which is being utilized to drive the impeller, such as air or water. The basic cylindrical form of the blades 11 imparts to them a low profile and low resistance or drag on the back sides of the blades away from the notches 17 while at the same time providing the impeller blades of the largest possible lengths for a given blade width or diameter. The net result is maximum efficiency in impeller performance and very low cost of manufacturing due to the fact that common commercial tubing or pipe is employed to fabricate the blades.

It is to be understood that the form of the invention herewith shown and described is to be taken as a preferred example of the same, and that various changes in the shape, size and arrangement of parts may be resorted to, without departing from the spirit of the invention or scope of the subjoined claims.

I claim:

1. An impeller for a fluid driven machine comprising an impeller shaft adapted for connection with a machine, a plurality of equal length equal diameter cylindrical cross section impeller blades fixed on said shaft substantially in equidistantly spaced relationship axially of the shaft, the impeller blades also being equidistantly spaced circumferentially of the shaft so as to define between adjacent blades equal acute angles around the circumference of the shaft, each impeller blade having a center full cylindrical hub portion provided with a through opening across the axis of the blade and coaxially of said shaft and receiving the shaft therethrough, and the opposite end portions of each impeller blade being cut away longitudinally of the blade on diametrically opposite sides of the blade from points defining the opposite ends of said hub to and through the opposite ends of the impeller blade, the opposite end portions of the impeller blade being straight and of equal length radially of said shaft and being cylindrically curved in cross section so as to define a pair of oppositely facing air scoops in relation to rotational movement of said shaft and the cylindrically curved wall of each scoop encompassing an arc greater than a half-cylinder around the longitudinal axis of each blade.

2. An impeller for a fluid driven machine as defined in claim 1, and spacer sleeves on said shaft between said impeller blades maintaining the blades substantially equidistantly spaced in parallel planes across the axis of said shaft.

* * * * *